United States Patent
Brohlin et al.

(10) Patent No.: US 7,932,703 B2
(45) Date of Patent: Apr. 26, 2011

(54) SYSTEM AND METHOD FOR SWITCH MODE POWER SUPPLY DELAY COMPENSATION

(75) Inventors: Paul L. Brohlin, Parker, TX (US);
Stephen Terry, Knoxville, TN (US);
Richard K. Stair, Knoxville, TN (US)

(73) Assignee: Texas Instruments Incorporated, Dallas, TX (US)

( * ) Notice: Subject to any disclaimer, the term of this patent is extended or adjusted under 35 U.S.C. 154(b) by 365 days.

(21) Appl. No.: 12/217,242

(22) Filed: Jul. 2, 2008

(65) Prior Publication Data
US 2010/0002472 A1     Jan. 7, 2010

(51) Int. Cl.
G05F 1/10     (2006.01)
G05F 1/652    (2006.01)

(52) U.S. Cl. ........ 323/222; 323/223; 323/224; 323/282; 323/284; 323/285

(58) Field of Classification Search .................. 323/222, 323/223, 224, 282, 284, 285
See application file for complete search history.

(56) References Cited

U.S. PATENT DOCUMENTS

| | | | | |
|---|---|---|---|---|
| 6,249,156 | B1 * | 6/2001 | Attwood | 327/110 |
| 6,958,592 | B2 * | 10/2005 | Chapuis | 323/246 |
| 7,446,513 | B2 * | 11/2008 | Dikken et al. | 323/271 |
| 2005/0110475 | A1 * | 5/2005 | Chapuis | 323/282 |
| 2006/0164867 | A1 * | 7/2006 | Dikken et al. | 363/13 |

* cited by examiner

*Primary Examiner* — Bao Q Vu
(74) *Attorney, Agent, or Firm* — William B. Kempler; Wade J. Brady, III; Frederick J. Telecky, Jr.

(57) ABSTRACT

A delay applied to a turn-on time for a high side switch in a switch mode power converter prevents oscillation between continuous and discontinuous conduction modes under light load conditions. The delay equalizes turn-on time for a high side switch with respect to continuous and discontinuous modes, so that turn-on time is not treated differently between the different modes. The delay value can be set for be equivalent to a propagation delay through a driver for a low side switch, in addition to a turn-off time for the low side switch. The addition of the delay element tends to maintain the switch mode power converter in a discontinuous mode under light load conditions and avoids oscillation between discontinuous and continuous conduction modes.

18 Claims, 2 Drawing Sheets

CONVERTER IN CONTINUOUS CONDUCTION MODE (CCM)

CONVERTER IN DISCONTINUOUS CONDUCTION MODE (DCM)

SYSTEM AND METHOD FOR SWITCH MODE POWER SUPPLY DELAY COMPENSATION

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present disclosure relates generally to power supply compensation, and more particularly to power supply parameter adjustment to improve light load operation.

DC/DC power converters can operate in a number of different modes, including continuous, discontinuous and transition modes. In continuous mode, also referred to sometimes as synchronous mode, an inductor that is charged and discharged has a substantially continuous current waveform, and may have negative current through the inductor. In transition mode, the inductor may have a continuous current waveform, and the inductor current is nonnegative. In discontinuous mode, sometimes referred to as nonsynchronous mode, the inductor current waveform is noncontinuous and the inductor current is nonnegative. In general, a DC/DC power converter can have improved efficiency at light loads when running in transition or discontinuous mode. In transition or discontinuous mode, negative inductor current can be prevented by using a low side power switch that turns off when inductor current reaches zero.

Referring to FIG. 1, a simplified circuit diagram of a power stage 100 of a conventional switching power supply is illustrated. Power stage 100 can be operated in discontinuous or transition conduction mode, in which current through an inductor 104 is prevented from becoming negative. A high side switch 101 charges inductor 104 when on. When a low side switch 102 is turned on, inductor 104 discharges, and current flowing through inductor 104 decreases toward zero. When the current through inductor 104 reaches zero, low side switch 102 is turned off, thereby preventing current in inductor 104 from becoming negative.

Synchronous or continuous conduction mode provides for inductor current becoming negative, so that inductor current is substantially continuous. Continuous conduction mode is typically used in heavy load operation to supply enough output current to meet the demands of the load. Illustrations of continuous mode waveforms and discontinuous mode waveforms are provided in FIGS. 2a, 2b, respectively.

A challenge in operating power stage 100 is to switch between continuous conduction mode and discontinuous conduction mode due to transitions between heavy and light loads on the output. For example, in discontinuous conduction mode, low side switch 102 is typically turned off before high side switch 101 turns on. In general, the situation in which high side switch 101 and a low side switch 102 are both on should be avoided to avoid cross-conduction problems, which may lead to incorrect operation of power stage 100 as well as damage or destruction of components in power stage 100. When power stage 100 operates in continuous conduction mode, cross-conduction is avoided by causing switch 102 to turn off before switch 101 is turned on. This type of dead time control (not shown) provides a slight delay between when switch 102 is turned off and when switch 101 is turned on to avoid cross conduction. Similarly, a dead time can be provided between when switch 101 turns off and when switch 102 turns on to avoid cross-conduction.

It can sometimes be challenging to coordinate the insertion of dead time in switching events when power stage 100 changes from discontinuous conduction mode to continuous conduction mode, or vice versa. When power stage 100 is driven with a PWM signal, a front end of a pulse for turning on switch 101 can become clipped because of the time delay associated with dead time for turning off low side switch 102 prior to permitting switch 101 to be turned on. In discontinuous conduction mode, because low side switch 102 is already off when a pulse is provided to turn on switch 101, a relatively longer pulse is applied to switch 101, since there is no clipping associated with dead time for turning off low side switch 102 prior to permitting switch 101 to be turned on.

A difficulty arises when power stage 100 operates in relatively light load conditions in which the mode may be continuous conduction or discontinuous conduction, depending upon the load. In continuous conduction mode, slightly less power is delivered to the load because of the clipped on time of high side switch 101. In addition, slightly greater power is delivered to the load when operating in discontinuous conduction mode because the pulse applied to switch 101 is slightly longer in comparison with equivalent continuous conduction mode. Because of the differences in on time for high side switch 101 in continuous conduction mode and discontinuous conduction mode, power stage 100 can be caused to oscillate between continuous conduction mode and discontinuous conduction mode. This oscillation can be problematic for efficiency, component protection and input boosting, for example.

BRIEF SUMMARY OF THE INVENTION

The disclosed system and method provide a compensation for a switch mode power converter to avoid oscillation between continuous conduction and discontinuous conduction modes. According to one exemplary embodiment, a delay element is provided to delay high side switch turn-on in a PWM controlled switch mode power converter. The delay element for turning on a high side switch maintains operation in discontinuous conduction mode to avoid continuous conduction operation at low current or light load conditions. According to one aspect, the delay element provides a delay approximately equal to the turn-off time for the low side switch. The delay can equal, for example, a driver propagation delay and low side switch turn-off time. Turn-on for the high side switch is inhibited for a period of time with the delay element, so that high side switch turn-on has an equalized delay with respect to operation in continuous or discontinuous conduction mode. The resulting equalized turn-on time for the high side switch avoids oscillation between discontinuous and continuous conduction modes.

According to another exemplary embodiment of the disclosed system and method, a dynamic delay is provided in permitting turn-on of a high side switch in a switch mode power converter. In this embodiment, a switching voltage is used to track a delay time to permit the delay to be dynamic in operation. In accordance with an exemplary embodiment, a PWM control signal having a frequency of approximately 3 MHz is used to drive the switch mode power supply, and the delay element has a delay of approximately 15 ns. According to an aspect, the disclosed system and method provides for the delay to be enabled or disabled in accordance with user criteria.

BRIEF DESCRIPTION OF THE SEVERAL VIEWS OF THE DRAWINGS

The disclosed system and method are described in greater detail below, with reference to the accompanying drawings, in which.

DETAILED DESCRIPTION OF THE INVENTION

The disclosed system and method provides a compensation for a switch mode power converter operating in discontinuous and continuous modes to avoid oscillation between operation in the different modes.

Figure 1:
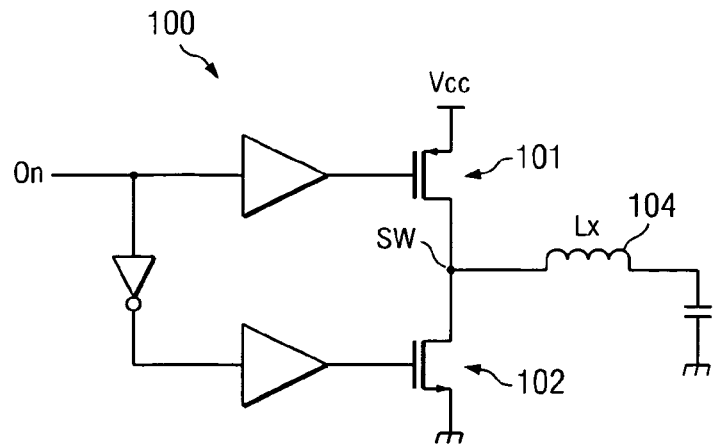
FIG. 1 is a circuit diagram of a switch mode power converter power stage.
Figure 3:
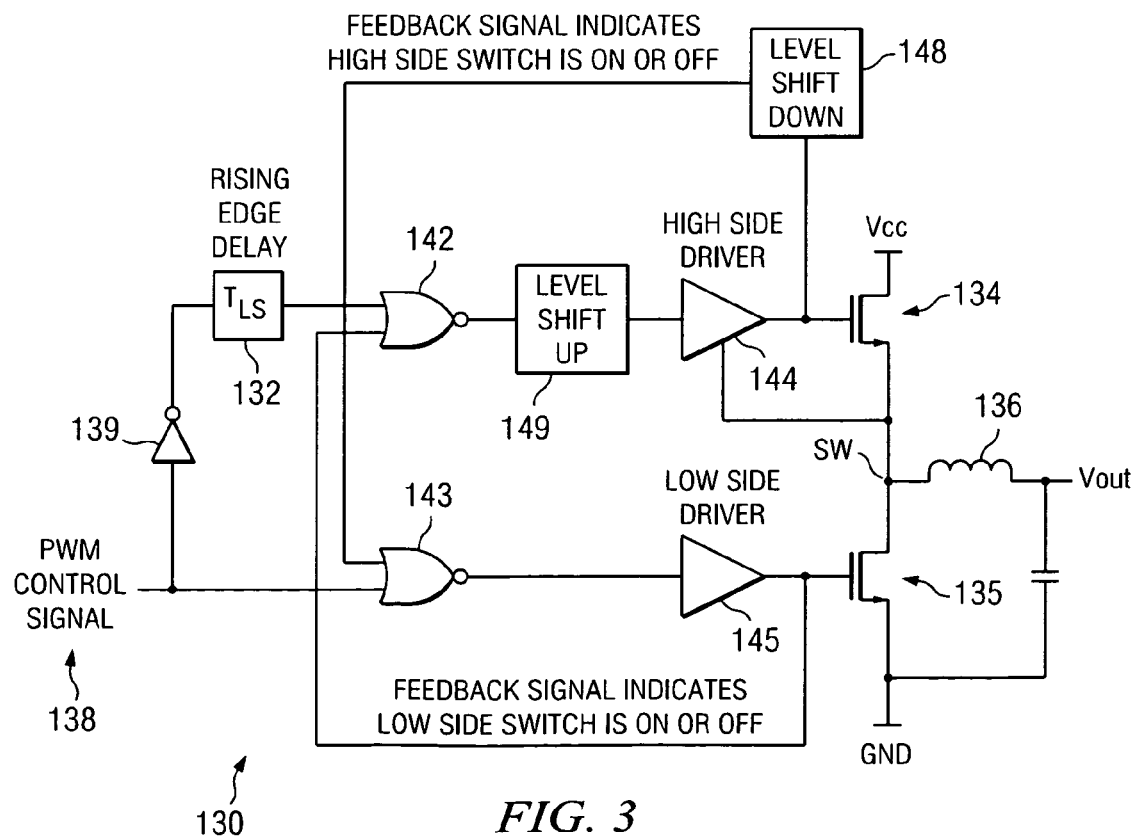
FIG. 3 is a circuit diagram of a switch mode power converter power stage in accordance with an exemplary embodiment of the disclosed system and method.
Figure 2A:
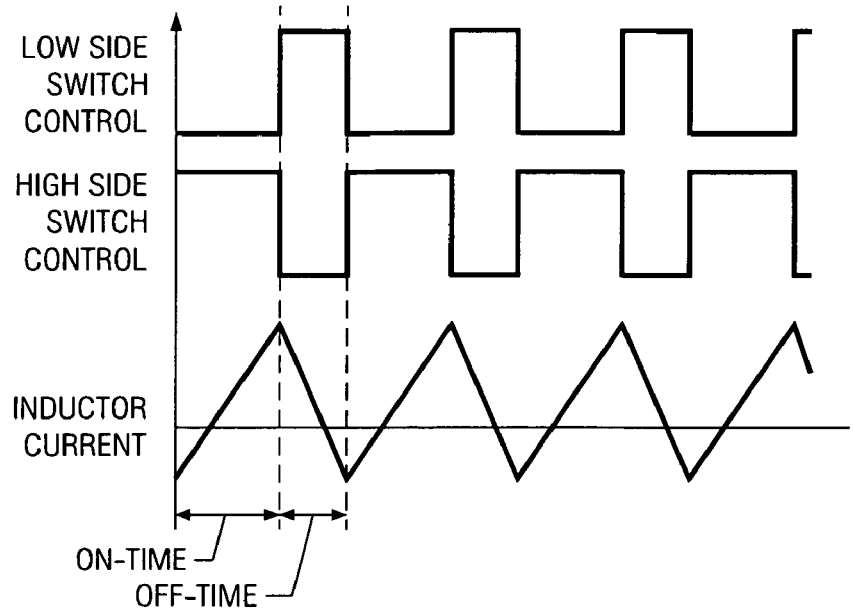
FIGS. 2a and 2b are graphs illustrating operation of a switch mode power converter in continuous conduction mode and discontinuous conduction mode, respectively.
Figure 2B:
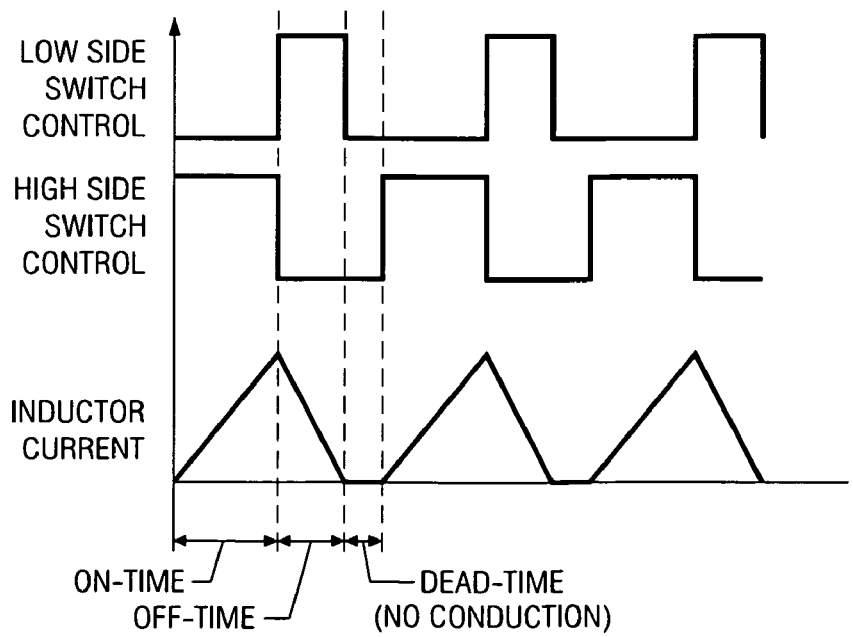

Referring now to FIG. 3, a circuit diagram 130 illustrates a control for a power stage of a switch mode power converter. Circuit 130 includes high and low side switches 134, 135 that are operated to charge and discharge inductor 136. According to an exemplary embodiment, high and low side switches 134, 135 are implemented as FETs, and in particular, MOSFETs. A PWM control signal 138 is used to drive high and low side switches 134, 135 to turn on and off in either a continuous or discontinuous conduction mode. An inverter 139 is used to prevent cross-conduction between switches 134, 135, so that one switch is off while the other switch is conducting. Drivers 144, 145 are used to drive switches 134, 135, respectively, to turn on and off in accordance with an input control signal. The input control signals are supplied by NOR gates 142, 143, which supply control signals to drivers 144, 145, respectively. One of the inputs to each of NOR gates 142, 143 is derived from an output of an opposite side driver to contribute to avoiding cross-conduction between switches 134, 135. Accordingly, when PWM control signal 138 becomes a logic high level, NOR gate 143 provides a logic low level output to cause low side driver 145 to turn off low side switch 135. The logic high signal provided by PWM control signal 138 is inverted by inverter 139 and applied to NOR gate 142, which also receives the output of low side driver 145, which transitions to a logic low level to cause the output of NOR gate 142 to become a logic high level. The propagation delay of PWM control signal 138 through inverter 139 and the propagation delays provided by NOR gate 143 and low side driver 145 help to provide a dead time to ensure low side switch 135 is off prior to the output of NOR gate 142 becoming a logic high level to turn on high side switch 134 through high side driver 144. A similar dead time is provided through propagation delays in NOR gate 142 and high side driver 144 to ensure turn-off of high side switch 134 prior to turn-on of low side switch 135.

As discussed above, a conventional switch mode power converter may oscillate between continuous conduction mode and discontinuous conduction mode during light load conditions. Light load conditions vary between power applications, but in general refer to load conditions where the average output current is relatively close to zero in relation to the magnitude of the power used in the application. Circuit 130 solves the drawbacks of oscillation between modes with the addition of a delay 132 provided between inverter 139 and NOR gate 142. According to an exemplary embodiment, delay 132 is implemented as a rising edge delay. The operation of delay 132 provides a delay for the turn-on of high side switch 134 and is active for operation in discontinuous as well as continuous conduction modes. By delaying the turn-on of high side switch 134 when the switch mode power converter represented by circuit 130 is operating in light load conditions, transition between discontinuous and continuous conduction modes can be controlled to provide a smooth transition that avoids oscillation. Delay 132 causes circuit 130 to continue to operate in discontinuous conduction mode for a longer period of time than might otherwise occur in the absence of delay 132. Accordingly, circuit 130 is biased with the introduction of delay 132 to operate in discontinuous conduction mode at light loads to avoid oscillation between discontinuous and continuous conduction modes. It should be apparent that delay 132 can be arranged to cause circuit 130 to be biased to operate in continuous conduction mode during light load conditions rather than oscillating between continuous and discontinuous conduction modes.

In accordance with one embodiment of the disclosed system and method, the switch mode power converter represented by circuit 130 operates at approximately 3 MHz. Delay 132 is set to a value of approximately 15 ns. Delay 132 may also be set to a value that represents a propagation delay through low side driver 145 in addition to a turn-off time for low side switch 135. For example, with circuit 130 operating at approximately 3 MHz, setting a value for delay 132 to 15 ns can represent a propagation delay through low side driver 145 and a turn-off time for low side switch 135.

According to another exemplary embodiment, delay 132 can be made to be dynamic in value. By making the delay value dynamic, delay 132 can respond to changing circuit conditions, such as may occur with changes in temperature or switching frequency. Delay 132 is constructed to track the actual delay of low side driver 145 by using delay elements that are similar to the elements used in low side driver 145. For example, low side driver 145 can be constructed as a string of inverters that have progressively higher ratings. Delay 132 is constructed out of similar inverters, so that the propagation delay tracks with that of low side driver 145 with changes in temperature or variations in process parameters.

Another exemplary embodiment provides for delay 132 to be implemented as a programmable monostable one-shot timer. The delay value can be programmed using the switching voltage applied to high side or low side switches 134, 135 to increase or decrease an indicator used to determine a delay value for delay 132. For example, the indicator may be a charge on a capacitor or a digital counter coupled with a digital to analog converter (DAC). The capacitor voltage or DAC output is applied to delay 132 to set a delay value. Delay 132 may also be enabled or disabled in accordance with user preferences.

Circuit 130 includes level shift elements 148 and 149 to provide a reference shift for the signals supplied between the high and low side portions of the switch mode power converter represented by circuit 130. As illustrated in circuit 130, high side driver 144 is referenced to the node voltage of node SW, so that signals shared between the high and low sides of circuit 130 can be properly referenced.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A system for controlling power conversion in a switch mode power converter, comprising:
   a high and a low side switch coupled to each other and to an inductor for switching current in the inductor;
   a control circuit coupled to the high and the low side switch and having a turn-on regulation element for regulating a time of a turn-on event for one or more of the high or the low side switches; and
   a dead time element in the control circuit configured to prevent cross-conduction between the high and the low side switches, wherein the turn-on time regulator is operable to equalize a turn-on time for one or more of the high or the low side switches between a continuous and discontinuous conduction mode.

2. The system according to claim 1, wherein the turn-on regulator comprises a delay element.

3. The system according to claim 2, wherein the delay element is configured to optimize a transition between continuous and discontinuous conduction modes.

4. The system according to claim 2, wherein the delay element is operable to provide a constant turn-on delay in either continuous or discontinuous conduction modes.

5. The system according to claim 2, further comprising a voltage detector on one or more of the high or the low side switch, the voltage detector being coupled to the delay element to modify a delay value in accordance with a detected voltage.

6. The system according to claim 1, further comprising an enable mechanism coupled to the turn-on regulator to enable or disable the turn-on regulator.

7. The system according to claim 2, wherein the delay element has a delay value approximately equivalent to a turn-off time for the low side switch.

8. The system according to claim 7, wherein the turn-off time of the low side switch includes a driver propagation delay and a turn-off time for the low side switch.

9. The system according to claim 2, wherein the delay element has a delay value of approximately 15 ns.

10. A method for controlling power conversion in a switch mode power converter have a high and a low side switch coupled to each other and to an inductor for switching current in the inductor, the method comprising:
    regulating a time of a turn-on event for one or more of the high or the low side switches; and
    preventing cross-conduction between the high and the low side switches; and equalizing a turn-on time for one or more of the high or the low side switches between a continuous and discontinuous conduction mode.

11. The method according to claim 10, further comprising providing a delay element to contribute to regulating the turn-on event time.

12. The method according to claim 11, further comprising configuring the delay element to optimize a transition between continuous and discontinuous conduction modes.

13. The method according to claim 11, further comprising providing a constant turn-on delay in either continuous or discontinuous conduction modes.

14. The method according to claim 11, further comprising:
    coupling a voltage detector to one or more of the high or the low side switches and to the delay element; and
    modifying a delay value in accordance with a detected voltage.

15. The method according to claim 10, further comprising enabling or disabling the turn-on regulator.

16. The method according to claim 11, further comprising setting a delay value for the delay element being approximately equivalent to a turn-off time for the low side switch.

17. The method according to claim 16, further comprising setting a delay value based on a driver propagation delay and a turn-off time for the low side switch.

18. The method according to claim 11, further comprising setting a delay value for the delay element of approximately 15 ns.

* * * * *